(12) United States Patent
Mate et al.

(10) Patent No.: US 8,160,629 B2
(45) Date of Patent: Apr. 17, 2012

(54) CONTROLLING REVERSE LINK INTERFERENCE IN PRIVATE ACCESS POINTS FOR WIRELESS NETWORKING

(75) Inventors: Amit Mate, Chelmsford, MA (US); Paul D'Arcy, Chelmsford, MA (US); Satish Ananthaiyer, Tewksbury, MA (US)

(73) Assignee: Airvana, Corp., Chelmsford, MA (US)

( * ) Notice: Subject to any disclaimer, the term of this patent is extended or adjusted under 35 U.S.C. 154(b) by 752 days.

(21) Appl. No.: 11/640,415

(22) Filed: Dec. 15, 2006

(65) Prior Publication Data

US 2008/0062925 A1  Mar. 13, 2008

Related U.S. Application Data

(60) Provisional application No. 60/824,877, filed on Sep. 7, 2006.

(51) Int. Cl.
*H04B 7/00* (2006.01)
(52) U.S. Cl. .............. 455/522; 455/500; 455/67.13; 455/67.7; 455/114.2; 455/450; 370/332; 370/328; 370/331
(58) Field of Classification Search .............. 370/329, 370/334; 455/552, 522, 524, 67.13
See application file for complete search history.

(56) References Cited

U.S. PATENT DOCUMENTS

| | | | |
|---|---|---|---|
| 5,623,495 A | 4/1997 | Eng et al. | |
| 6,163,524 A | 12/2000 | Magnusson et al. | |
| 6,208,873 B1 * | 3/2001 | Black et al. | 455/522 |
| 6,233,231 B1 | 5/2001 | Felix et al. | |
| 6,272,122 B1 | 8/2001 | Wee | |
| 6,301,484 B1 | 10/2001 | Rogers et al. | |
| 6,317,452 B1 | 11/2001 | Durrant et al. | |
| 6,400,755 B1 | 6/2002 | Harris et al. | |
| 6,560,194 B1 | 5/2003 | Gourgue et al. | |
| 6,597,677 B1 | 7/2003 | Segawa | |
| 6,615,038 B1 | 9/2003 | Moles et al. | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,804,216 B1 | 10/2004 | Kuwahara et al. | |
| 6,876,690 B1 | 4/2005 | Imbeni et al. | |
| 7,170,871 B2 | 1/2007 | Eyuboglu et al. | |

(Continued)

FOREIGN PATENT DOCUMENTS

CN  101536587 A  9/2009

(Continued)

OTHER PUBLICATIONS

U.S. Appl. No. 11/617,298, filed Dec. 28, 2006, including application as filed, transaction history (PTO website), and pending claims.

(Continued)

*Primary Examiner* — Charles N. Appiah
*Assistant Examiner* — Randy Peaches
(74) *Attorney, Agent, or Firm* — Fish & Richardson P.C.

(57) ABSTRACT

In a radio access network in which a first access terminal uses a first access point to access the network and a second access terminal uses a second access point to access the network, interference is reduced in communications between the first access terminal and the first access point by adjusting signal power levels of the second access terminal without requiring coordination between the first and second access points.

77 Claims, 4 Drawing Sheets

U.S. PATENT DOCUMENTS

| | | | |
|---|---|---|---|
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 2002/0051437 | A1 | 5/2002 | Take |
| 2002/0101943 | A1 | 8/2002 | Proctor, Jr. |
| 2002/0167907 | A1* | 11/2002 | Sarkar et al. ............. 370/252 |
| 2002/0196749 | A1 | 12/2002 | Eyuboglu et al. |
| 2003/0026225 | A1 | 2/2003 | Ogino et al. |
| 2003/0065805 | A1 | 4/2003 | Barnes, Jr. |
| 2003/0100311 | A1 | 5/2003 | Chung et al. |
| 2003/0114180 | A1* | 6/2003 | Black et al. ............. 455/522 |
| 2004/0076120 | A1 | 4/2004 | Ishidoshiro |
| 2004/0081134 | A1 | 4/2004 | Kotzin |
| 2004/0081144 | A1 | 4/2004 | Martin et al. |
| 2004/0177270 | A1 | 9/2004 | Little et al. |
| 2004/0258027 | A1 | 12/2004 | Tsybakov et al. |
| 2005/0026640 | A1 | 2/2005 | Pan |
| 2005/0213555 | A1 | 9/2005 | Eyuboglu et al. |
| 2005/0232242 | A1 | 10/2005 | Karaoguz et al. |
| 2005/0243749 | A1 | 11/2005 | Mehrabanzad et al. |
| 2005/0245279 | A1 | 11/2005 | Mehrabanzad et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0159045 | A1* | 7/2006 | Ananthaiyer et al. ........ 370/329 |
| 2006/0203746 | A1 | 9/2006 | Maggenti et al. |
| 2006/0209721 | A1* | 9/2006 | Mese et al. ............. 370/254 |
| 2006/0240782 | A1 | 10/2006 | Pollman et al. |
| 2006/0291420 | A1 | 12/2006 | Ng |
| 2006/0294241 | A1 | 12/2006 | Cherian et al. |
| 2007/0010261 | A1 | 1/2007 | Dravida et al. |
| 2007/0026884 | A1 | 2/2007 | Rao |
| 2007/0058628 | A1 | 3/2007 | Rao et al. |
| 2007/0077948 | A1 | 4/2007 | Sharma et al. |
| 2007/0097916 | A1 | 5/2007 | Eyuboglu et al. |
| 2007/0115896 | A1 | 5/2007 | To et al. |
| 2007/0140163 | A1 | 6/2007 | Meier et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0213049 | A1 | 9/2007 | Bishop |
| 2007/0220573 | A1 | 9/2007 | Chiussi et al. |
| 2007/0230392 | A1* | 10/2007 | Adams et al. ............. 370/318 |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248042 | A1 | 10/2007 | Harikumar et al. |
| 2007/0265013 | A1 | 11/2007 | Labedz |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |
| 2008/0253550 | A1 | 10/2008 | Ch'ng et al. |
| 2008/0254792 | A1 | 10/2008 | Ch'ng |
| 2009/0034440 | A1 | 2/2009 | Samar et al. |

FOREIGN PATENT DOCUMENTS

| | | |
|---|---|---|
| EP | 907263 | 4/1999 |
| EP | 2 046 084 A1 | 4/2009 |
| GB | 2456090 | 7/2009 |
| GB | 2456694 A8 | 7/2009 |
| WO | WO98/49844 | 11/1998 |
| WO | WO2007/008574 | 1/2007 |
| WO | WO2008/030933 | 3/2008 |
| WO | WO2008/030934 | 3/2008 |
| WO | WO2008/030956 | 3/2008 |
| WO | WO2008/082985 | 7/2008 |

OTHER PUBLICATIONS

PCT application No. PCT/US2007/088112 filed on Dec. 19, 2007, with Publication No. WO2008/082985, published on Jul. 10, 2008, including application as filed, transaction history (PTO website).

International Search Report and Written Opinion mailed Jun. 3, 2008 from PCT application No. PCT/US2007/088112 (13 pages).

International Search Report and Written Opinion mailed Dec. 19, 2008 from PCT application No. PCT/US2007/77755 (12 pages).

Kramer et al., "Building and Measuring a High Performance Network Architecture," Apr. 20, 2001, pp. 31, LBNL Technical Report No. LBNL 47274:WTCK.

$3^{rd}$ Generation Partnership Project "3GPP2", "cdma2000 High Rate Packet Data Air Interface Specification", TIA/EIA/IS-856, C.S0024, version 4.0, Oct. 25, 2002 (548 pages).

3rd Generation Partnership Project "3GPP2", "cdma2000 High Rate Data Air Interface Specification", TIA/EIA/IS-856, C.S0024-A, version 2.0, Jul. 2005 (1227 pages).

3rd Generation Partnership Project "3GPP2", "cdma2000 High Rate Data Air Interface Specification", TIA/EIA/IS-856, C.S0024-B, version 1.0, Apr. 2006 (1623 pages).

Office action from U.S. Appl. No. 11/640,503 mailed Oct. 10, 2008.

*International Search Report and Written Opinion of the International Searching Authority*, from corresponding International application No. PCT/US2007/77725, Patent Cooperation Treaty, mailed Mar. 20, 2008, 14 pages.

International Preliminary Report on Patentability from PCT application No. PCT/US2007/077725 mailed Mar. 19, 2009 (11 pages).

International Preliminary Report on Patentability from PCT application No. PCT/US2007/077722 mailed Mar. 19, 2009 (11 pages).

International Preliminary Report on Patentability from PCT application No. PCT/US2007/077755 mailed Mar. 19, 2009 (8 pages).

U.S. Appl. No. 60/824,877, filed Sep. 7, 2006, including application as filed and transaction history from (PTO website).

PCT application No. PCT/US2007/77725 filed on Sep. 6, 2007, with Publication No. WO2008/030934, including application as filed, transaction history from (PTO website).

U.S. Appl. No. 11/640,501, filed Dec. 15, 2006, including application as filed, transaction history from (PTO website), and pending claims.

PCT application No. PCT/US2007/77722 filed on Sep. 6, 2007, with Publication No. WO2008/030933, including application as filed, transaction history (PTO website).

International Search Report and Written Opinion from related U.S. Appl. No. 11/640,501 with corresponding PCT application No. PCT/US2007/77722, mailed on May 5, 2008, 44 pages.

U.S. Appl. No. 11/640,503, filed Dec. 15, 2006, including application as filed, transaction history (PTO website), and pending claims.

PCT application No. PCT/US2007/077755 filed on Sep. 6, 2007, with Publication No. WO2008/030956, including application as filed, transaction history (PTO website).

Office action from U.S. Appl. No. 11/640,503 mailed May 7, 2009.

Office action and response history of U.S. Appl. No. 11/617,298 to Nov. 5, 2009.

International Preliminary Report on Patentability from PCT application No. PCT/US2007/088112 mailed Jul. 9, 2009 (7 pages).

Office action and response history of U.S. Appl. No. 11/640,503 to Oct. 9, 2009.

Examination Report for GB Application No. 0905846.2 mailed Sep. 10, 2009 (2 pages).

Office action and response history of U.S. Appl. No. 11/640,501 to Oct. 22, 2009.

Office action and response history of U.S. Appl. No. 11/640,503 to Jan. 6, 2010.

Response filed in GB Application No. 0905846.2 filed on Jan. 8, 2010.

Office action and response history of U.S. Appl. No. 11/640,501 to Jan. 20, 2010.
Fish & Richardson P.C., Response to Non Final Office action mailed Oct. 7, 2010 in U.S. Appl. No. 11/640,501, filed Jan. 7, 2011, 21 pages.
Office action and response history of U.S. Appl. No. 11/640,501 to Apr. 27, 2010.
Office action and response history of U.S. Appl. No. 11/640,503 to May 28, 2010.
Office action and response history of U.S. Appl. No. 11/617,298 to Jul. 15, 2010.
Fish & Richardson P.C., Response to Final Office action mailed Apr. 27, 2010 in U.S. Appl. No. 11/640,501, filed on Jul. 27, 2010, 21 pages.
Examination Report issued Jul. 26, 2010 from United Kingdom patent application No. GB0905844.7, 2 pages.
U.S. Randy Peaches, USPTO Non Final Office Action in U.S. Appl. No. 11/640,501, dated Oct. 7, 2010, 52 pages.
Fish & Richardson P.C., Response to Final Office action mailed Jul. 15, 2010 in U.S. Appl. No. 11/617,298, filed on Oct. 15, 2010, 14 pages.
Fish & Richardson P.C., Response to Final Office action mailed Mar. 30, 2011 in U.S. Appl. No. 11/640,501, filed on Sep. 30, 2011, 22 pages.
USPTO Non Final Office Action in U.S. Appl. No. 11/617,298, dated Nov. 2, 2011, 14 pages.
Harry Newton, Newton's Telecom Dictionary, Mar. 2007, Flatrion Publishing, 23$^{rd}$, p. 1006. 48.
USPTO Non Final Office Action in U.S. Appl. No. 11/617,298, dated Jan. 18, 2011, 16 pages.
USPTO Non Final Office Action in U.S. Appl. No. 11/640,501, dated Mar. 30, 2011, 51 pages.
Fish & Richardson P.C., Response to Non Final Office action mailed Jan. 18, 2011 in U.S. Appl. No. 11/617,298, filed on Apr. 18, 2011, 10 pages.
USPTO Non Final Office Action in U.S. Appl. No. 11/640,503, dated Feb. 3, 2011, 14 pages.
Fish & Richardson P.C., Response to Non Final Office action mailed Feb. 3, 2011 in U.S. Appl. No. 11/640,503, filed on May 3, 2011, 21 pages.
USPTO Final Office Action in U.S. Appl. No. 11/617,298, dated Jun. 23, 2011, 14 pages.
Fish & Richardson P.C., Response to Final Office action mailed Jun. 23, 2011 in U.S. Appl. No. 11/617,298, filed on Aug. 23, 2011, 11 pages.
USPTO Notice of Allowance in U.S. Appl. No. 11/640,503, dated Aug. 8, 2011, 8 pages.
USPTO Examiner's Amendment in U.S. Appl. No. 11/640,503, dated Aug. 8, 2011, 1 page.

* cited by examiner

CONTROLLING REVERSE LINK INTERFERENCE IN PRIVATE ACCESS POINTS FOR WIRELESS NETWORKING

CLAIM OF PRIORITY

This application claims priority under 35 U.S.C. §119(e) to U.S. Patent Application Ser. No. 60/824,877, filed on Sep. 7, 2006, the entire contents of which are hereby incorporated by reference.

BACKGROUND

This description relates to controlling reverse link interference in private access points for wireless networking.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs) located in the cell. Each cell is often further divided into sectors 102a-c, 104a-c, 106a-c by using multiple sectorized antennas. A BTS is identified by one or more of several properties, which may include the phase offset of its pilot signal (PN offset), a frequency, or an IP address. A sector may be identified by a SectorID. Together, a PN offset and Sector ID may uniquely identify a sector. In each cell, that cell's radio network access point may serve one or more sectors and may communicate with multiple access terminals in its cell.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B, version 1.0, May 2006, and is also incorporated herein by reference. Other wireless communication protocols may also be used.

SUMMARY

In general, in one aspect, in a radio access network in which a first access terminal uses a first access point to access the network and a second access terminal uses a second access point to access the network, interference is reduced in communications between the first access terminal and the first access point by adjusting signal power levels of the second access terminal without requiring coordination between the first and second access points.

Implementations may include one or more of the following features.

An identification of the first access point is received from the second access terminal. The identification of the first access point includes a route update message. The first access point transmits a power control command using a first identification parameter without specific knowledge of whether any access terminals are receiving commands using the first identification parameter. The second access point causes the second access terminal to respond to commands from the first access point that are sent using a first identification parameter, the first identification parameter being identified by the second access point without consulting the first access point. The first identification parameter includes a mac-index value. The same first identification parameter is provided to multiple second access terminals. Third access terminals are caused to respond to commands from the first access point that are sent using a second identification parameter, the second identification parameter being identified by the second access point without consulting the first access point and being the same for all of the third access terminals. The first identification parameter is allocated to the second access terminals and the second identification parameter is allocated to the third access terminals based at least in part on a power level of signals from the first access point at the second and third access terminals. The second access point causes a first group of third access terminals to respond to commands from the first access point that are sent using the first identification parameter, and causes a second group of third access terminals to respond to commands from the first access point that are sent using a second identification parameter, the second identification parameter being identified by the second access point without consulting the first access point. The second access point receives an identification of the first access point from each third access terminal, each identification including an indication of a power level of signals from the first access point.

The first access point transmits commands to cause the first and second access terminals to have different behaviors. The commands cause the first access terminal to communicate data to the first access point. The commands cause the second access terminal to not communicate data to the first access point. Transmitting commands includes transmitting a DRC-lock command to the first access terminal and transmitting a DRC-unlock command to the second access terminal.

The first access point transmits a command associated with power levels to the second access terminal based on a determination about a rise over thermal measurement at the first access point. The determination is that the rise over thermal measurement is less than a threshold. The threshold is computed based on a number of access terminals in communication with the first access point. The number of access terminals is a number of access terminals using the first access point to access the network. The determination is that the rise over thermal measurement is greater than a threshold. The command allows the second access terminal to use a high signal power level. The command includes an RPC UP command. The first access point transmits a command to the second access terminal that allows the second access terminal to use high signal power levels based on a determination that a rise over thermal measurement at the first access point is less than a threshold. The command causes the second access terminal to use a low signal power level. The command repeatedly instructs the second access terminal to use a low signal power. The second access terminal is repeatedly instructed to use a low signal power by alternatingly transmitting an RPC UP command and an RPC DN command to the interfering access terminal including transmitting the RPC DN command a pre-determined number of times for each RPC UP command that is transmitted. The predetermined number of times is once. The first access point repeatedly instructs the second access terminal to use a low signal power, based on a determination that a rise over thermal measurement at the first access point is greater than a threshold.

The command instructs the first access terminal and the second access terminal to use a lower bit rate. The first access terminal determines that a pilot signal from the first access point has a power greater than a first pilot threshold, and uses the command in determining whether to decrease signal power. The first access terminal computes the first pilot threshold. The first access terminal identifies the pilot signal from the first access point based on a DRC-lock command received from the first access point. The first access terminal determines that a pilot signal from the second access point has a power greater than a second pilot threshold, and uses the command in determining whether to decrease signal power. The first access terminal computes the second pilot threshold. The first pilot threshold is larger than the second pilot threshold. The first pilot threshold is less than the second pilot threshold. The first access terminal identifies the pilot signal from the second access point based on a DRC-unlock command received from the second access point. The second access terminal determines that a pilot signal from the second access point has a power greater than a first pilot threshold, and uses the instruction received from the first access point in determining whether to decrease signal power. The second access terminal identifies the pilot signal from the second access point based on a DRC-lock command received from the second access point. The second access terminal determines that a pilot signal from the first access point has a power greater than a second pilot threshold, and uses the instruction received from the first access point in determining whether to decrease signal power, the first pilot threshold being larger than the second pilot threshold. The second access terminal identifies the pilot signal from the first access point based on a DRC-unlock command received from the first access point.

The first access point instructs the first access terminal and the second access terminal to use a lower bit rate based on a determination that a rise over thermal measurement at the first access point is greater than an RoT threshold. The second access terminal determines that a pilot signal from the first access point has a power greater than a first threshold, and decreases signal power for data signals. The second access terminal determines that the pilot signal from the first access point has a power greater than a second threshold, and decreases signal power for voice signals. The second threshold is larger than the first threshold.

At the first access point, upon being powered-up or reset, commands are transmitted to control power levels of the second access terminal. The commands include an RPC command and a RAB stream. A radio of the first access point is modified to transmit a per-slot rise over thermal measurement to a digital signal processor. A DSP of the first access point is modified to compute access terminal communication settings by comparing rise over thermal measurements to thresholds, open a plurality of power control sub-channels for interference control signaling, and send patterns of power control commands based on RoT measurements. The access terminal communication settings include RAB settings. The power control commands include RPC commands. A call control module of the first access point is modified to allocate a-priori known traffic channels on neighboring access points. The first access point uses two or more frequencies for reverse-link communications with the second access terminal. Using two or more frequencies for reverse-link communications includes transmitting an RAB channel for a first frequency using a first mac-index value, and transmitting an RAB channel for a second frequency using a second mac-index value. Using two or more frequencies for reverse-link communications includes communicating to the second access terminal an association between mac-index values and individual frequencies of the two or more frequencies. Using two or more frequencies for reverse-link communications includes configuring the second access terminal a-priori with an association between mac-index values and individual frequencies of the two or more frequencies. The first access point is operated at least partially by a party other than an operator of the radio access network. The second access point is operated by an operator of the radio access network.

These and other aspects and features and various combinations of them may be expressed as methods, apparatus, systems, means for performing functions, program products, and in other ways.

The described techniques have several advantages. No changes are required to air interface standards. No implementation is required on the access terminals—their communication with the access points is the same as communication with a regular access point, and the access terminals do not need to know which they is communicating with. No communication is required between access points—because they communicate directly with interfering access terminals, the access points do not have to communicate with each other. No communication is required with a Configuration Server—the use of game theory algorithms allows the access points to resolve their conflicts for a mutually beneficial outcome without central coordination. It does not compromise sector throughput because interfering access terminals are prevented from increasing their signal power. It does not require connections to be dropped immediately—interference can be resolved by adjusting power levels without dropping connections. They are scalable for a large number of neighboring access points—in some examples, 16 access points and 5 strong interference sources can be present in the access channel without. An access terminal can react to rate-setting signals from up to five interfering access points. Deployments are scalable for increasing numbers of access terminals per access point—it requires only 1 mac index reservation per access point because that mac index can be allocated to all the access terminals that are interfering with a given access point. They allow real-time control of interference, and it is easy to implement, test, verify, and optimize with minimal software changes because no changes are required to the air interface standard or the hardware. Interference can be selectively mitigated based on such considerations as best-effort or VoIP traffic.

Other features and advantages will be apparent from the description a the claims.

DETAILED DESCRIPTION

Figure 1:
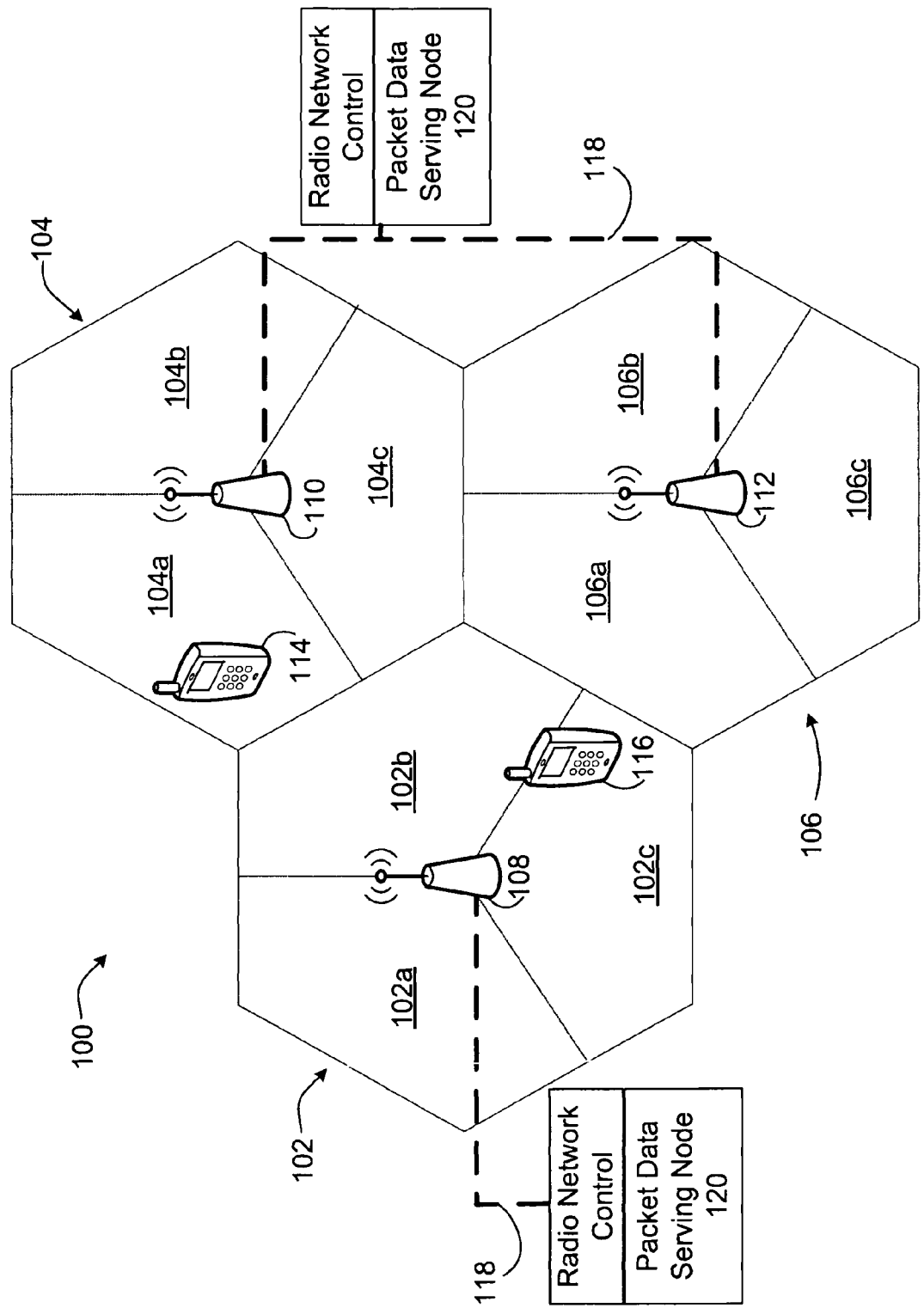
FIG. 1 is a block diagram of a radio access network.

Referring to FIG. 1, a radio access network (RAN) 100 uses an Ev-DO protocol to transmit data packets between an access terminal, e.g., access terminals 114 and 116, and a radio network access point, e.g., access points 108, 110, 112. The access points are connected over a backhaul connection 118 to radio network control/packet data serving nodes (RNC/PDSN) 120, which may be one or more physical devices at different locations.

Figure 2:
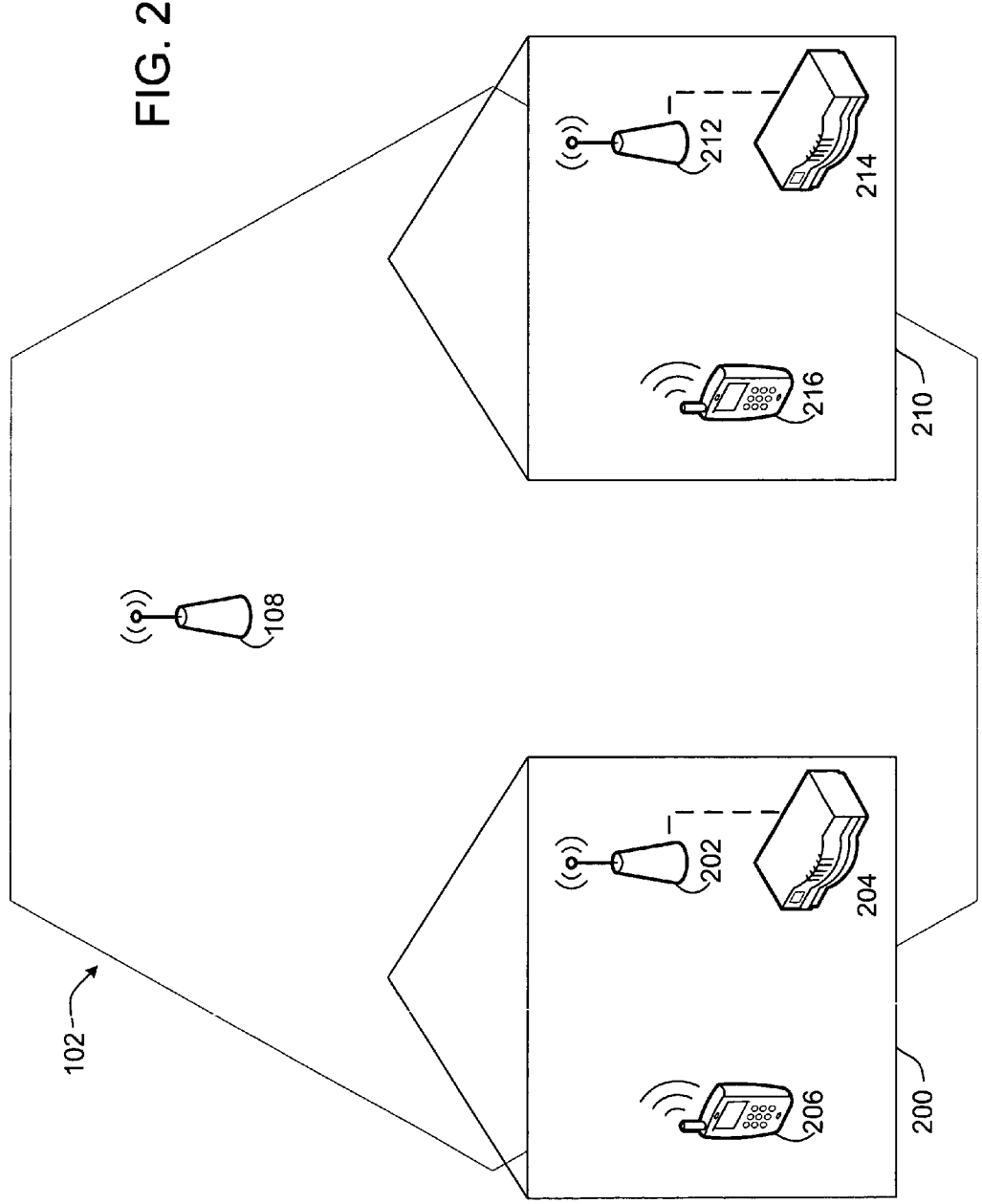
FIG. 2 is a block diagram of a home networking deployment.

In some examples, as shown in FIG. 2, a radio network access point 202 may be deployed in a user's home 200 in a similar manner as a WiFi® access point. Such a radio network access point is sometimes referred to in this description as a private access point. The private access point 202 may use an available high-speed internet connection, such as DSL or cable modem 204, as the backhaul with the RNC/PDSN functionality implemented in the access point 202. Such a private access point may be installed anywhere that it is advantageous to do so, for example, in an office, a public space, or a restaurant. When this description refers to a private access point being in a "home" that encompasses any such location. A private access point is different from a picocell access point in that it may be intended to only provide access for the user that installs it in his home or those he authorizes, as opposed to a picocell which may serve a similar venue but provides access to any subscriber of the network. In some examples, a private access point may be integrated into a cable modem or other network hardware, such as a router or WiFi access point.

When an authorized access terminal 206 is present inside the home (or anywhere within range of the private access point 202), it uses the access point 202 rather than a regular cellular radio network access point such as access point 108 to place or receive voice calls and data connections, even if it is otherwise within the cell 102 for that access point 108. We sometimes refer to the standard access point 108 as a macro access point or macro BTS to distinguish it from a private access point, as it provides direct access to the wider RAN. A neighboring home 210 may have its own private access point 212 connected to its cable modem 214 for use by its owner's access terminal 216. A private access point deployment is different than traditional radio network deployment because neighboring private access points are intended to operate independently, in part because real-time communications is difficult between neighboring private access points. The private access point deployment is also different than WiFi deployment in that it is intended to operate in licensed spectrum. Some details and examples are discussed in co-pending application Ser. Nos. 11/640,501, titled Provisioning Private Access Points for Wireless Networking, filed Dec. 15, 2006, and 11/640,503, titled Configuring Preferred User Zone Lists for Private Access Points for Wireless Networking, filed Dec. 15, 2006, which are incorporated here by reference.

Access lists of authorized access terminals for each private access point can be configured on a central server and distributed to the private access points. Information to locate and access the private access points can be distributed to access terminals using an over-the-air parameter administration (OTAPA) system. Access terminals may also retrieve access information from the configuration server themselves using over-the-air service provisioning (OTASP). A mobile internet protocol (mobile IP) can be used along with voice call continuity (VCC) for handoffs between private access points. Several terms are defined as follows. Forward link (FL) refers to transmissions from an access point to an access terminal; reverse link (RL) refers to transmissions from an access terminal to an access point. Rise over thermal (RoT) is an amount of electromagnetic energy measured at an antenna over the amount that due to background noise. RoT is one measure of interference. Although this description uses terminology from EV-DO standards, the same concepts are applicable to other communication methods, including GSM, UMTS, HSDPA, WiMax, WiBro, WiFi, and the like. For example, when we refer to a reverse power control (RPC) signal, this should be taken to refer to any signal used by a base station to control power levels of an access terminal.
Reducing Reverse Link Interference In some examples, for a cost-effective deployment, all private access points in a given metropolitan area operate on the same uplink/downlink frequency pair, or in one of a defined set of frequency pairs. Because many access terminals that are using private access points are transmitting at the same frequencies (the pair of uplink/downlink frequencies), they may interfere with each other. In addition, because real-time communication between private access points is difficult, they may lack soft handover (SHO) capabilities. That is, neighboring private access points may not exchange information to transition a given access terminal from one access point to the other as it moves between them, like macro access points would in a traditional network. These two shortcomings may result in an unstable system. Other home wireless systems, such as WiFi® and Bluetooth®, operate in unlicensed spectrum and are mostly orthogonal frequency-division multiplexing (OFDM)-based, hence they can use cognitive radio-based interference avoidance mechanisms or do not need RL interference mitigation. For private access points, reverse link interference can be addressed from a game theory perspective. For example, the game has players access point 202, access point 212 . . . access point n (All operating at the same frequency but each with a unique PN offset and SectorId), an objective of maximizing throughput (both forward and reverse) in required coverage areas, and each player has possible actions of increasing or decreasing its own transmission power, increasing or decreasing all access terminals' transmission power, or requesting that other access points reduce their transmission power. When an access terminal sees a private access point other than the private access point providing it with network access (referred to in this description as the home access point or linked access point) as a strong interference on the forward link, the linked access point can request the interfering access point to reduce its transmit power. The interfering access point may choose to do so, for example, if it does not have any active connections. Here it is assumed that private access points operate within a transmit-power range defined by two variables, pmax and pmin.

To let the private access points co-operate, it is helpful to have a mechanism so that they can influence each other's objective, that is, they will not operate as isolated networks. The technique is scalable to any number of access points. The game begins when an access terminal decides to communicate using a preferred private access point.

Figure 3:
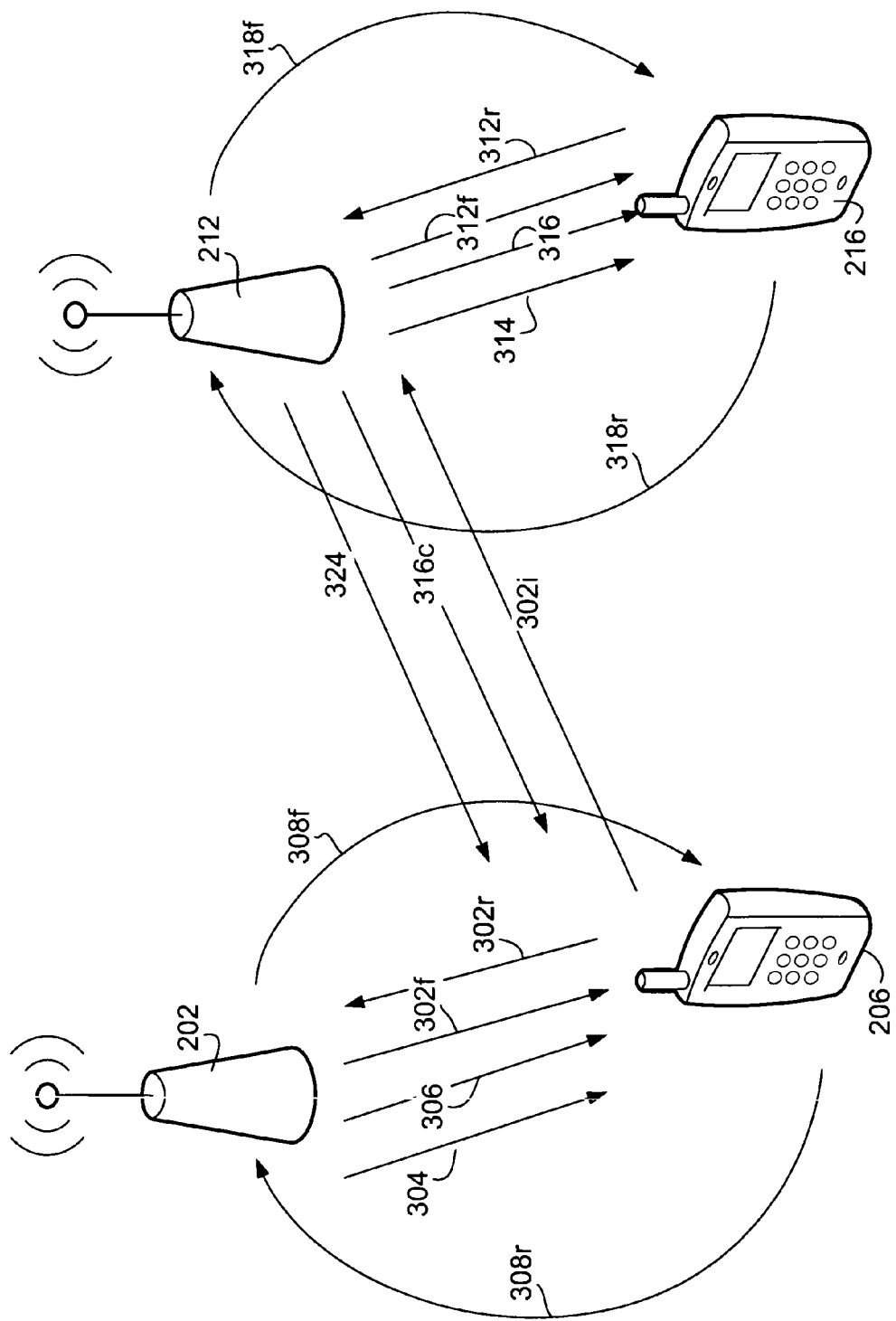
FIGS. 3 and 4 are schematic diagrams of signals transmitted between radio network access points and access terminals.

FIG. 3 illustrates an example of a situation where the two private access points 202 and 212 and their respective access terminals 206, 216 may interfere with one another, but it is inconvenient or undesirable for the private access points 202 and 212 to communicate directly with each other. Arrows indicate different signals transmitted between devices. Data 302 is sent from each access point to its associated access terminals. In EV-DO, there are several signals used to control traffic rates and power levels. On the forward link, a forward medium access control (MAC) channel transmits a number of control signals, including a reverse power control (RPC) signal, a reverse activity (RA) signal, and a Data Rate Control (DRC) lock signal. There is also a forward control channel, which carries control message and may also carry user traffic. In the reverse link from the access terminal to the access point, an RA channel transmits a reverse link activity bit (RAB) stream. The reverse link also includes a reverse rate indicator (RRI) channel, a DRC/DSC (data rate control, data source control) channel, and a reverse traffic channel. The RRI channel is used to indicate the data rate being transmitted on the reverse traffic channel. The DRC channel is used to indicate what forward traffic data rate the access terminal can accept. Once a base station is connected to an access terminal and has configured a forward data rate, the DRC Lock signal is sent on the forward link to indicate to the access terminal that the base station can decode the access terminal's DRC channel and that the access terminal can direct its DRS/DSC to that base station. The access terminal also transmits an access channel to initiate communication with the access network and to respond to control messages. Several of these signals or the data carried on them can be used to reduce interference caused by neighboring private access points or the access terminals using them.

In the example of FIG. 3, each access point 202, 212 is transmitting RPC commands 304, 314 and an RAB stream 306, 316 on a MAC channel, and forward data traffic 302*f*, 312*f* in the traffic channel. Each access terminal 206, 216 is transmitting reverse data traffic 302*r*, 312*r* to its corresponding access point. To control addressing of commands from access points to access terminals, a "mac-index" value is used. In a typical network deployment, each access terminal that is receiving commands from a given base station is assigned a different mac-index, which we refer to here as mac-index-k, mac-index-j, etc. An access terminal is informed of which mac-index values to use for each base station when it transmits a "route update" message (RUP) on the reverse access channel to report on what base stations it can detect pilot signals from.

The forward control channel and reverse access channel are shown by arrows 308*f* and 308*r*, respectively, for access point 202 access terminal 206, and arrows 318*f* and 318*r* for access point 212 and access terminal 216. For example, arrows 308*r* and 318*r* may represent a connection request message from the respective access terminals 206, 216 to the access points 202, 212. Arrows 308*f* and 318*f* may represent traffic channel assignments in the opposite direction.

In the case of access point deployment, access points may not be able to communicate with each other as rapidly as macro network base stations, thus when the access terminal 206 reports in its RUP message 308*r* to access point 202 that it detects a pilot signal from the access point 212, the access point 202 needs to know a-priori which mac-index to instruct the access terminal 206 to respond to when receiving commands from the neighboring access point 212. To facilitate this, each private access point is assigned a specific mac-index that it will use for communicating with all interfering access terminals. In this discussion, we will refer to the mac-index used by access point 212 to control interfering access terminals including 206 as "mac-index-k." The private access points may determine what mac-index values a neighbor is using by deriving it from an identifier of the neighboring access point, such as its PN Offset or Sector ID.

For each mac-index parameter on a given base station there is a power control sub-channel on the forward link from that base station which is used to control the transmit power of an access terminal which is assigned that mac-index. For example, access point 212 will use the power control sub-channel k, identified by the parameter "powercontrol-sub-channel-k," to control the power of access terminal 206 and any other interfering access terminals. Parameters mac-index-k, powercontrol-subchannel-k, and "FTC-valid" will be transmitted from the access point 202 to the access terminal 206 as part of the forward control signal 308*f*, so that the access terminal 206 will respond to commands from the access point 212 addressed to mac-index-k.

The DRC lock bit is transmitted in the MAC channel from each access point to the access terminals using it. To keep each access terminal communicating with the correct access point, each access point sends a DRC lock bit to its own access terminal and a DRC unlock bit to other interfering access terminals. This means, for example, that the access terminal 206 always points to access point 202 because access point 202 is sending it a DRC lock bit on whichever mac-index it is using to control it, and access point 212 is sending it a DRC unlock bit using mac-index-k. The access terminal 206 will therefore direct its DRC channel only to the access point 202 and not to the access point 212.

In the example of FIG. 3, the access terminal 206's reverse-link data signal 302*r* is causing interference at the access point 212, shown by arrow 302*i*, and the access point 212 can take several steps to reduce this interference.

An RPC bit is used to tell an access terminal whether to increase or decrease the signal strength of its transmissions (by sending "UP" or "DN" commands, respectively). In addition to RPC commands 304, 314 sent from each private access point to its associated access terminal, the access point 212 sends an RPC command 324 to the interfering access terminal 206. A DN setting from one BTS overrides an UP setting from another. Each of the private access points measures the RoT observed at its antenna. This measurement may include the energy of signals transmitted by the access terminals. For a low RoT at access point 212, i.e., less than some "RoT threshold1" parameter, the access point 212 sends an RPC 'UP' command 324 to the access terminal 206. This means that as far as access point 212 is concerned, the access terminal 206 may increase the power of its transmissions, and any decreases will be directed by the access point 202 only (since any DN commands it says will dominate).

For higher RoT levels at access point 212, i.e., greater than an "RoT threshold2" parameter, the RPC command 324 is set at DN some k % of the time. This means that the access terminal 206 can have its power decreased by both access point 202 and access point 212. To power down the interfering access terminal 206 by 1 db, the access point 212 can send the RPC bit 324 in a pattern such as "DN, DN, UP, DN, UP, DN . . . " with an RPC step size=0.5 dB. The first two DN commands will cause the access terminal to reduce power by 1 dB, and the subsequent alternating UP and DN commands will keep it there. In some examples, an access terminal which is far from its linked private access point cannot sustain a connection at this power level and will be likely to switch to the macro network, thus changing frequencies and stopping interfering with the access point 212. The RoT threshold1, RoT threshold2, and RoT threshold3 values can be obtained via testing or simulation, and may be dynamically configured based on the number of connections on a private access point.

Another solution is to adjust the RAB settings. The bit rate on the reverse link is related to power levels, so instructing an access terminal to use a lower bit rate may also lower its power. In some examples, data traffic causes more interference than voice traffic on the reverse link, due to its higher bit rates. Data transmissions may also be a lower priority than voice, since interruptions are less noticeable to the user. Data rates can therefore be lowered at lower interference levels than voice rates. Put another way, a base station may be configured to tolerate more interference from voice signals than it tolerates from data signals. An access terminal may be configured to reduce power if its data traffic is causing interference at a lower threshold than it would require before reducing power for voice traffic. In some examples, power is controlled through reverse link bit rate reductions for RoT levels at access point 212 above some "RoT threshold3" above the RoT threshold1 but below the RoT threshold2 discussed above. To accomplish this, the RAB bit 316 from access point 212 is set (arrow 316*c* showing the bit crossing over to the interfering access terminal 206), potentially causing both access terminals 206 and 216 to reduce bitrate and therefore power. In particular, each AT compares the pilot strength (the strength of a pilot signal used to locate the base station) for each private access point to a corresponding threshold. If the pilot strength for a given access point is above the corresponding threshold, the access terminal includes the RAB bit in configuring its reverse traffic channel media access controller (RTCMAC) settings, reducing bitrate and power.

The pilot strength of the access terminal's linked private access point (202 for access terminal 206) is compared to a "PilotStrengthQRABThresholdDRCLock" threshold, and the pilot strength of a foreign access point (i.e., 212 for access terminal 206) is compared to a "PilotStrengthQRABThresholdDRCUnlock" threshold. As long as PilotStrengthQRABThresholdDRCUnlock<PilotStrengthQRABThresholdDRCLock, an interfering access terminal will reduce power before one associated with a given base station will. Put another way, an access terminal will reduce power based on an RAB bit from a foreign base station at a lower threshold than it would based on an RAB from its own.

In some examples, additional mac-index-j and powercontrol-subchannel-j parameters can be added at each private access point, and access terminals which are nearer to a private access point experiencing interference can be put on this second mac-index. When an access terminal reports pilot signals to its linked private access point via the RUP message, it includes the strength of each pilot signal, thus the linked private access point knows how close the access terminal is to the other base station. The linked private access point can then assign that other station's first mac-index-k to close access terminals and it second mac-index-j to farther-away access terminals. The other base station can then use this to control two groups of interfering access terminals differently. For example, it can instruct nearby access terminals to decrease their power, since they would be causing more interference, while ignoring the access terminals that are farther away. The interference control mac-indices can be allocated such that they can be conveniently decoded based on a-priori information about neighboring private access points, e.g., PN offsets.

A combination of these approaches can be used to assure that an access terminal reduces the power level of its data signals as needed, but requires higher thresholds of interference before compromising its voice signals.

Figure 4:
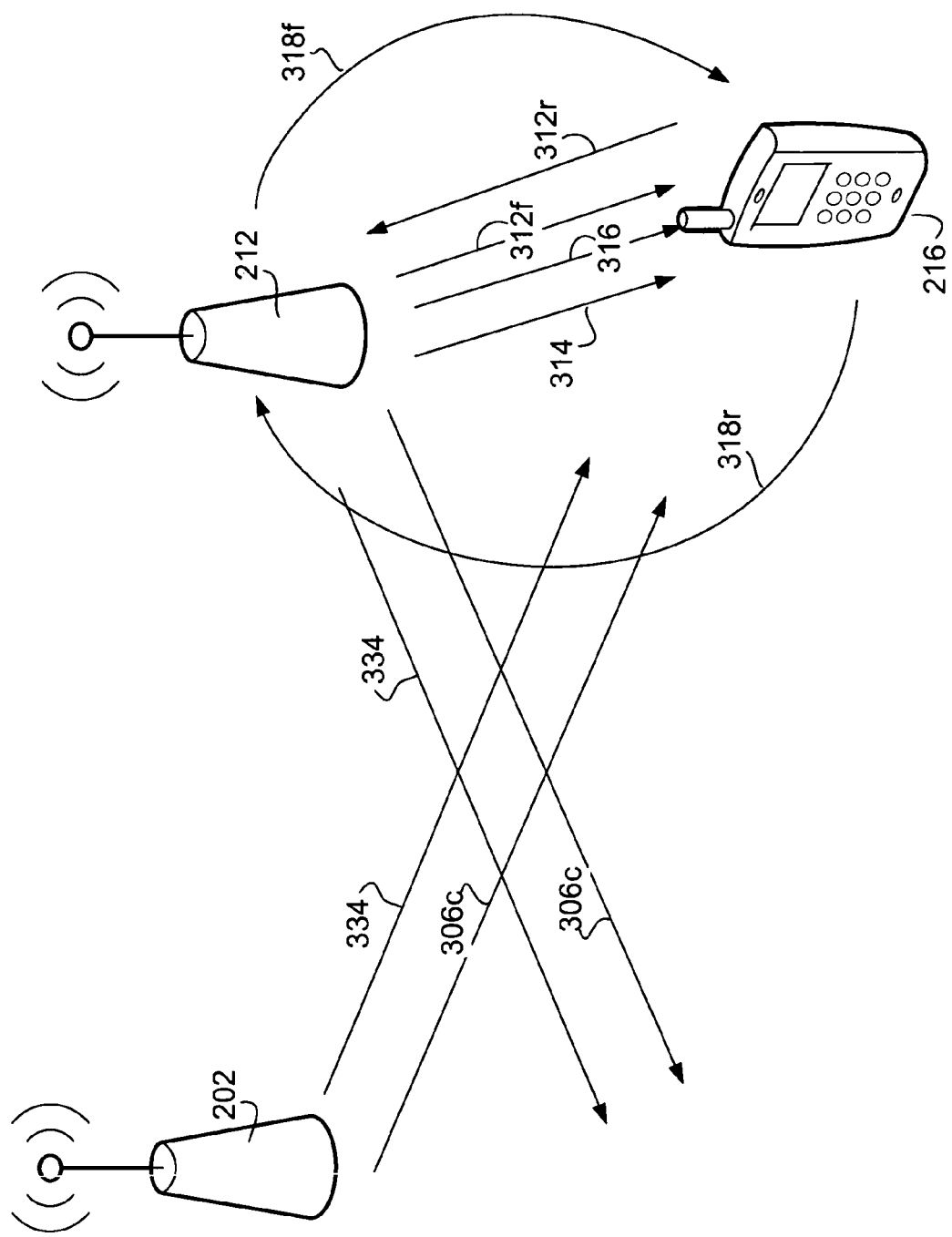

FIG. 4 shows another example of interference, where the neighboring access point 202 is interfering with communications between the access point 212 and its access terminal 216, but is not currently serving any access terminals itself. To address this, each private access point transmits its RPC channel and an RAB bit on startup. These signals may be received by other access terminals, as shown by arrows 306c, 334. It may then be taken into account by the access terminal 216 in setting signal levels to overcome the potential interference.

In some examples, if private access points can efficiently communicate with each other, an OOB forward link transmit power control mechanism (within configurable maximum and minimum power limits) can be implemented based on requests sent to a neighboring private access point. Such requests can be generated by private access points based on filtering the RUP messages sent by their respective access terminals. For example, when access terminal 216 reports in its RUP that it sees pilot signals from both access point 202 and access point 212, access point 212 can tell access point 202 to reduce its forward link power if no access terminals are using it at the moment.

These reverse link interference mitigation techniques achieve several objectives. They enable in-home deployment of EV-DO Rev-A private access points in licensed spectrum with minimal or no wastage of reverse link capacity. They enable rate control of interfering access terminals by neighboring private access points thereby maintaining QoS for access terminals in their respective private access point areas. They enable large scale deployment, i.e., multiple private access points in a given area operating at the same frequency.

The described RL Interference control techniques can be implemented in three parts. First, an RoT-based radio is modified to be capable of sending at least per-slot hardware RoT measurements to the DSP module. Next, a DSP module implementing Rev-A Phy-Mac is modified to be capable of RAB setting based on the disclosed algorithm for selecting a dynamic RoT threshold, opening one or many power control sub-channel(s) for interference control purposes, and sending appropriate patterns of RPC commands based on RoT measurements to the Power Rate Control modules in the access terminals. Finally, a CallControl module on the private access point is modified to allocate a-priori known traffic channels on the neighboring private access points.

In some examples, for operating private access points in high density urban areas (where, e.g., more than 512 private access points will be deployed in a spherical radius of 200 m), more than one reverse link frequency may need to be associated with private access point reverse link operation. In this scenario, RL interference can be very high (e.g., RoT>some "RoT threshold4") due to a large concentration of private access points and access terminals in a small region. The EV-DO Rev-B mode of operation may be used, where a second frequency is used for accommodating more access terminals operating at the same time. For such a deployment, private access points which support two reverse link frequencies can transmit a RAB channel corresponding to two frequencies. In existing systems, the RAB channel is transmitted using a well-defined mac-index, which corresponds to the default reverse link frequency pair.

In some examples, another mac-index is reserved for operation at two reverse link frequencies. The association between the mac-index and frequency can be indicated to the access terminal in a traffic-channel assignment. Alternatively, a group of mac-indices can be reserved for multi-frequency reverse-link operation and the association between the frequency and RAB channel mac-index can be known a-priori. This mechanism allows the operator to operate the private access point on the same forward link frequency as the overlay macro access points. Such a mechanism enables the operator to make use of asymmetric spectrum and saves a portion of spectrum bandwidth for other purposes.

These techniques can also be used to mitigate interference between a private access point and a macro access point. For example, if a macro access point is operating on the same frequency as a private access point, they could operate in the manner described above for neighboring private access points to reduce reverse link interference.

Although the techniques described above employ the 1xEV-DO air interface standard, the techniques are also applicable to other CDMA and non-CDMA air interface technologies in which access points are installed in small-scale deployments. For example, in High Speed Uplink Packet Access (HSUPA), when an access terminal is moving, a user in a soft handoff area receives NodeB cell scheduling control signals form each radio link, and the access terminal combines the transmission rate control signaling from various cells to determine the uplink data transmission format. A radio network controller achieves soft handoff gain by selecting and combining the demodulation data packets sent from each NobeB radio link set. Thus, the techniques described above can be applied to HSUPA radio networks.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The techniques described herein can be performed in a different order and still achieve desirable results

What is claimed is:

1. A method performed in a radio access network in which a first access terminal uses a first access point to access the radio access network and a second access terminal uses a second access point to access the radio access network, the method comprising:

transmitting, from the first access point to the second access terminal, a communication that causes a reduction in interference in communications between the first access terminal and the first access point by adjusting signal power levels of the second access terminal without requiring coordination between the first and second access points;

wherein adjusting signal power levels of the second access terminal comprises adjusting a bit rate of the second access terminal; and wherein the first private access point is configured to tolerate more interference from voice signals transmitted by the second access terminal than from data signals transmitted by the second access terminal.

2. The method of claim 1 also comprising causing the second access point to receive an identification of the first access point from the second access terminal.

3. The method of claim 2 in which the identification of the first access point comprises a route update message.

4. The method of claim 1 also comprising the first access point transmitting a power control command using a first identification parameter without specific knowledge of whether any access terminals are receiving commands using the first identification parameter.

5. The method of claim 1 also comprising:

the second access point causing the second access terminal to respond to commands from the first access point that are sent using a first identification parameter, the first identification parameter being identified by the second access point without consulting the first access point.

6. The method of claim 5 in which the first identification parameter comprises a mac-index value.

7. The method of claim 5 also comprising providing the same first identification parameter to multiple second access terminals.

8. The method of claim 7 also comprising causing third access terminals to respond to commands from the first access point that are sent using a second identification parameter, the second identification parameter being identified by the second access point without consulting the first access point and being the same for all of the third access terminals.

9. The method of claim 8 in which the first identification parameter is allocated to the second access terminals and the second identification parameter is allocated to the third access terminals based at least in part on a power level of signals from the first access point at the second and third access terminals.

10. The method of claim 5 also comprising:
the second access point
causing a first group of third access terminals to respond to commands from the first access point that are sent using the first identification parameter, and
causing a second group of third access terminals to respond to commands from the first access point that are sent using a second identification parameter,
the second identification parameter being identified by the second access point without consulting the first access point.

11. The method of claim 10 also comprising the second access point receiving an identification of the first access point from each third access terminal, each identification including an indication of a power level of signals from the first access point.

12. The method of claim 1 also comprising:
the first access point transmitting commands to cause the first and second access terminals to have different behaviors.

13. The method of claim 12 in which the commands cause the first access terminal to communicate data to the first access point.

14. The method of claim 12 in which the commands cause the second access terminal to not communicate data to the first access point.

15. The method of claim 12 in which transmitting commands comprises:
transmitting a DRC-lock command to the first access terminal and transmitting a DRC-unlock command to the second access terminal.

16. The method of claim 1 also comprising:
the first access point transmitting a command associated with power levels to the second access terminal based on a determination about a rise over thermal measurement at the first access point.

17. The method of claim 16 in which the determination is that the rise over thermal measurement is less than a threshold.

18. The method of claim 17 also comprising computing the threshold based on a number of access terminals in communication with the first access point.

19. The method of claim 18 in which the number of access terminals is a number of access terminals using the first access point to access the radio access network.

20. The method of claim 16 in which the determination is that the rise over thermal measurement is greater than a threshold.

21. The method of claim 16 in which the command allows the second access terminal to use a high signal power level.

22. The method of claim 21 in which the command comprises an RPC UP command.

23. The method of claim 16 in which the command causes the second access terminal to use a low signal power level.

24. The method of claim 16 in which the command repeatedly instructs the second access terminal to use a low signal power.

25. The method of claim 24 in which repeatedly instructing the second access terminal to use a low signal power comprises alternatingly transmitting an RPC UP command and an RPC DN command to the interfering access terminal.

26. The method of claim 25 comprising transmitting the RPC DN command a pre-determined number of times for each RPC UP command that is transmitted.

27. The method of claim 16 in which the command instructs the first access terminal and the second access terminal to use a lower bit rate.

28. The method of claim 27 also comprising:
the first access terminal determining that a pilot signal from the first access point has a power greater than a first pilot threshold, and using the command in determining whether to decrease signal power.

29. The method of 28 also comprising the first access terminal computing the first pilot threshold.

30. The method of claim 28 also comprising the first access terminal identifying the pilot signal from the first access point based on a DRC-lock command received from the first access point.

31. The method of claim 28 also comprising:
the first access terminal determining that a pilot signal from the second access point has a power greater than a second pilot threshold, and using the command in determining whether to decrease signal power.

32. The method of claim 31 in which the first pilot threshold is larger than the second pilot threshold.

33. The method of claim 31 also comprising the first access terminal identifying the pilot signal from the second access point based on a DRC-unlock command received from the second access point.

34. The method of claim 1 also comprising:
the second access terminal determining that a pilot signal from the first access point has a power greater than a first threshold, and decreasing signal power for data signals.

35. The method of claim 34 also comprising:
the second access terminal determining that the pilot signal from the first access point has a power greater than a second threshold, and decreasing signal power for voice signals.

36. The method of claim 35 in which the second threshold is larger than the first threshold.

37. The method of claim 1 also comprising:
the first access point, upon being powered-up or reset, transmitting commands to control power levels of the second access terminal.

38. The method of claim 37 in which the commands comprise an RPC command and a RAB stream.

39. The method of claim 1 also comprising:
modifying a radio of the first access point to transmit a per-slot rise over thermal measurement to a digital signal processor.

40. The method of claim 39 also comprising:
modifying a DSP of the first access point to
compute access terminal communication settings by comparing rise over thermal measurements to thresholds,
open a plurality of power control sub-channels for interference control signaling, and
send patterns of power control commands based on RoT measurements.

41. The method of claim 40 in which the access terminal communication settings include RAB settings.

42. The method of claim 40 in which the power control commands include RPC commands.

43. The method of claim 1 also comprising:
modifying a call control module of the first access point to allocate a-priori known traffic channels on neighboring access points.

44. The method of claim 1 also comprising:
the first access point using two or more frequencies for reverse-link communications with the second access terminal.

45. The method of claim 44 in which using two or more frequencies for reverse-link communications comprises
transmitting an RAB channel for a first frequency using a first mac-index value, and transmitting an RAB channel for a second frequency using a second mac-index value.

46. The method of claim 44 in which using two or more frequencies for reverse-link communications comprises communicating to the second access terminal an association between mac-index values and individual frequencies of the two or more frequencies.

47. The method of claim 44 in which using two or more frequencies for reverse-link communications comprises configuring the second access terminal a-priori with an association between mac-index values and individual frequencies of the two or more frequencies.

48. The method of claim 1 in which the first access point is operated at least partially by a party other than an operator of the radio access network.

49. The method of claim 1 in which the second access point is operated by an operator of the radio access network.

50. The method of claim 1 in which the radio access network uses an Ev-DO protocol.

51. The method of claim 1 in which the radio access network uses an HSUPA protocol.

52. A system comprising:
a first access point to connect a first access terminal to a radio access network; and
a second access point to connect a second access terminal to the radio access network;
wherein the first access point is configured to:
transmit, to the second access terminal, a communication that causes a reduction in interference in communications between the first access terminal and the first access point by adjusting signal power levels of the second access terminal without requiring coordination between the first and second access points;
wherein adjusting signal power levels of the second access terminal comprises adjusting a bit rate of the second access terminal; and
wherein the first private access point is configured to tolerate more interference from voice signals transmitted by the second access terminal than from data signals transmitted by the second access terminal.

53. The system of claim 52 in which:
the second access point is configured to cause the second access terminal to respond to commands from the first access point that are sent using a first identification parameter, the first identification parameter being identified by the second access point without consulting the first access point.

54. The system of claim 52 in which the second access point is configured to:
cause a first group of third access terminals to respond to commands from the first access point that are sent using the first identification parameter, and
cause a second group of third access terminals to respond to commands from the first access point that are sent using a second identification parameter,
the second identification parameter being identified by the second access point without consulting the first access point.

55. The system of claim 54 in which the second access point is configured to receive an identification of the first access point from each third access terminal, each identification including an indication of a power level of signals from the first access point.

56. The system of claim 52 in which:
the first access point is configured to transmit a command associated with power levels to the second access terminal based on a determination about a rise over thermal measurement at the first access point.

57. The system of claim 52 in which:
the first access point is configured to, upon being powered-up or reset, transmit commands to control power levels of the second access terminal.

58. The system of claim 52 in which:
a radio of the first access point is configured to transmit a per-slot rise over thermal measurement to a digital signal processor.

59. The system of claim 57 in which:
a DSP of the first access point is configured to
compute access terminal communication settings by comparing rise over thermal measurements to thresholds,
open a plurality of power control sub-channels for interference control signaling, and
send patterns of power control commands based on RoT measurements.

60. The system of claim 52 in which:
a call control module of the first access point is configured to allocate a-priori known traffic channels on neighboring access points.

61. A non-transitory computer readable medium comprising instructions to cause one or more processors in a radio access network in which a first access terminal uses a first access point to access the radio access network and a second access terminal uses a second access point to access the radio access network to:
transmit, from the first access point to the second access terminal, a communication that causes a reduction in interference in communications between the first access terminal and the first access point by adjusting signal power levels of the second access terminal without requiring coordination between the first and second access points,
wherein adjusting signal power levels of the second access terminal comprises adjusting a bit rate of the second access terminal; and
wherein the first private access point is configured to tolerate more interference from voice signals transmitted by the second access terminal than from data signals transmitted by the second access terminal.

62. The non-transitory computer readable medium of claim 61 in which the instructions cause:
the second access point to cause the second access terminal to respond to commands from the first access point that are sent using a first identification parameter, the first identification parameter being identified by the second access point without consulting the first access point.

63. The non-transitory computer readable medium of claim 61 in which the instructions cause the second access point to:
cause a first group of third access terminals to respond to commands from the first access point that are sent using the first identification parameter, and
cause a second group of third access terminals to respond to commands from the first access point that are sent using a second identification parameter,
the second identification parameter being identified by the second access point without consulting the first access point.

64. The non-transitory computer readable medium of claim 63 in which the instructions cause the second access point to receive an identification of the first access point from each third access terminal, each identification including an indication of a power level of signals from the first access point.

65. The non-transitory computer readable medium of claim 61 in which the instructions cause the first access point to transmit a command associated with power levels to the second access terminal based on a determination about a rise over thermal measurement at the first access point.

66. The non-transitory computer readable medium of claim 61 in which the instructions cause the first access point to, upon being powered-up or reset, transmit commands to control power levels of the second access terminal.

67. The non-transitory computer readable medium of claim 61 in which the instructions cause:
a radio of the first access point to transmit a per-slot rise over thermal measurement to a digital signal processor.

68. The non-transitory computer readable medium of claim 67 in which the instructions cause:
a DSP of the first access point to
compute access terminal communication settings by comparing rise over thermal measurements to thresholds,
open a plurality of power control sub-channels for interference control signaling, and
send patterns of power control commands based on RoT measurements.

69. The non-transitory computer readable medium of claim 61 in which the instructions cause:
a call control module of the first access point to allocate a-priori known traffic channels on neighboring access points.

70. An apparatus comprising:
a first access point for use in a radio access network in which:
a first access terminal uses the first access point to access the radio access network; and
a second access terminal uses a second access point to access the radio access network, the apparatus configured to:
transmit, from the first access point to the second access terminal, a communication that causes a reduction in interference in communications with the first access terminal by adjusting signal power levels of the second access terminal without requiring coordination with the second access point,
wherein adjusting signal power levels of the second access terminal comprises adjusting a bit rate of the second access terminal; and
wherein the first private access point is configured to tolerate more interference from voice signals transmitted by the second access terminal than from data signals transmitted by the second access terminal.

71. The apparatus of claim 70 also configured to transmit a power control command using a first identification parameter without specific knowledge of whether any access terminals are receiving commands using the first identification parameter.

72. The apparatus of claim 70 also configured to transmit a command associated with power levels to the second access terminal based on a determination about a rise over thermal measurement at the apparatus.

73. The apparatus of claim 70 also configured to, upon being powered-up or reset, transmit commands to control power levels of the second access terminal.

74. The apparatus of claim 70 also comprising:
a radio to transmit a per-slot rise over thermal measurement to a digital signal processor.

75. The apparatus of claim 74 also comprising:
a DSP to:
compute access terminal communication settings by comparing rise over thermal measurements to thresholds,
open a plurality of power control sub-channels for interference control signaling, and
send patterns of power control commands based on RoT measurements.

76. The apparatus of claim 70 also comprising:
a call control module to allocate a-priori known traffic channels on neighboring access points.

77. The apparatus of claim 70 also configured to uses two or more frequencies for reverse-link communications with the second access terminal.

* * * * *

UNITED STATES PATENT AND TRADEMARK OFFICE
CERTIFICATE OF CORRECTION

PATENT NO.         : 8,160,629 B2
APPLICATION NO.    : 11/640415
DATED              : April 17, 2012
INVENTOR(S)        : Amit Mate It is certified that error appears in the above-identified patent and that said Letters Patent is hereby corrected as shown below:

Column 14, Line 6, In Claim 29, delete "28" and insert -- claim 28 --, therefor.

Signed and Sealed this
Twelfth Day of June, 2012

David J. Kappos
*Director of the United States Patent and Trademark Office*